United States Patent

Patten

[15] 3,677,425
[45] July 18, 1972

[54] LAND AND WATER CRAFT TRAILER UNIT

[72] Inventor: Dan H. Patten, P.O. Box 18517, Salt Lake City, Utah 84118

[22] Filed: June 15, 1970

[21] Appl. No.: 46,256

[52] U.S. Cl..........................214/85.1, 296/1 A, 105/368 R
[51] Int. Cl..........................................................B60p 3/08
[58] Field of Search.....................214/85.1, 84; 280/414; 296/1 A; 105/368 R

[56] References Cited

UNITED STATES PATENTS

| | | | |
|---|---|---|---|
| 2,492,980 | 1/1950 | Garnett | 296/1 A |
| 2,121,245 | 6/1938 | Francis | 296/1 A X |
| 2,765,938 | 10/1956 | Di Addezio | 296/1 A X |
| 2,841,436 | 7/1958 | Stuart | 296/1 A |
| 3,334,940 | 8/1967 | Demos | 296/1 A |

Primary Examiner—Albert J. Makay
Attorney—B. Deon Criddle

[57] ABSTRACT

A trailer unit that will simultaneously haul land and water craft and wherein a supporting trailer for the water craft is adapted to be winched into place or with minor modifications to be used as a separate towing trailer.

5 Claims, 8 Drawing Figures

Patented July 18, 1972

INVENTOR:
DAN H. PATTEN

BY: B. Dean Criddle

ATTORNEY.

INVENTOR:
DAN H. PATTEN
BY: *B. Dean Griddle*
ATTORNEY.

LAND AND WATER CRAFT TRAILER UNIT

BRIEF DESCRIPTION OF THE INVENTION

1. Field of the Invention

This invention relates to trailers and especially to trailers used for hauling land vehicles and or boats.

Prior Art

There have long been available trailers designed for use in carrying wheeled vehicles and trailers designed for carrying boats. In addition, there have been known large stack type trailers or transports used for carrying large numbers of motor vehicles or boats, with the motor vehicles generally being driven up ramps and onto the trailers and the boats being hoisted into place on their trailers with cranes or the like.

However, to the best of my knowledge, there has not heretofore been available a trailer unit developed for use by the sportsman who wants to simultaneously tow both a land vehicle, such as a jeep or an all terrain vehicle and a boat.

The Invention

It is an object of the present invention to provide a trailer unit that can be conveniently used by sportsmen to simultaneously tow both a land vehicle and a boat, behind a car, truck, or camper unit or other motor vehicle.

Principal features of the trailer unit of the invention include its stacked construction and its track arrangement whereby a motor vehicle is transported on a lower deck and a boat is transported on an upper deck; a boat carrying trailer for supporting the boat constructed so that it can be used, with but minor modification, as a towing trailer for the boat, when only the boat is to be towed; and winch means operable to move the support trailer and boat carried thereby onto the multiple trailer.

Additional objects and features will become apparent from the following detailed description and drawings, disclosing what is presently contemplated as being the best mode of the invention.

THE DRAWINGS

In the drawings:

FIG. 1. is a side elevation view of the trailer unit of the invention, with a boat and a land vehicle shown in place to be carried thereon;

FIG. 2, a top plan view of the trailer unit of the invention;

FIG. 3, a front elevation view;

FIG. 4, a rear elevation view;

FIG. 5, an enlarged, fragmentary side elevation view of the front end of the trailer unit of the invention;

FIG. 6, a perspective view of the boat carrying trailer that is moved onto and off of the trailer unit of the invention;

FIG. 7, an enlarged, fragmentary view of the front axle mounting of the boat carrying trailer taken within the line 7—7 of FIG. 6; and FIG. 8, an enlarged, fragmentary side elevation view of a typical ramp used with the trailer unit.

DETAILED DESCRIPTION

Figure 1:
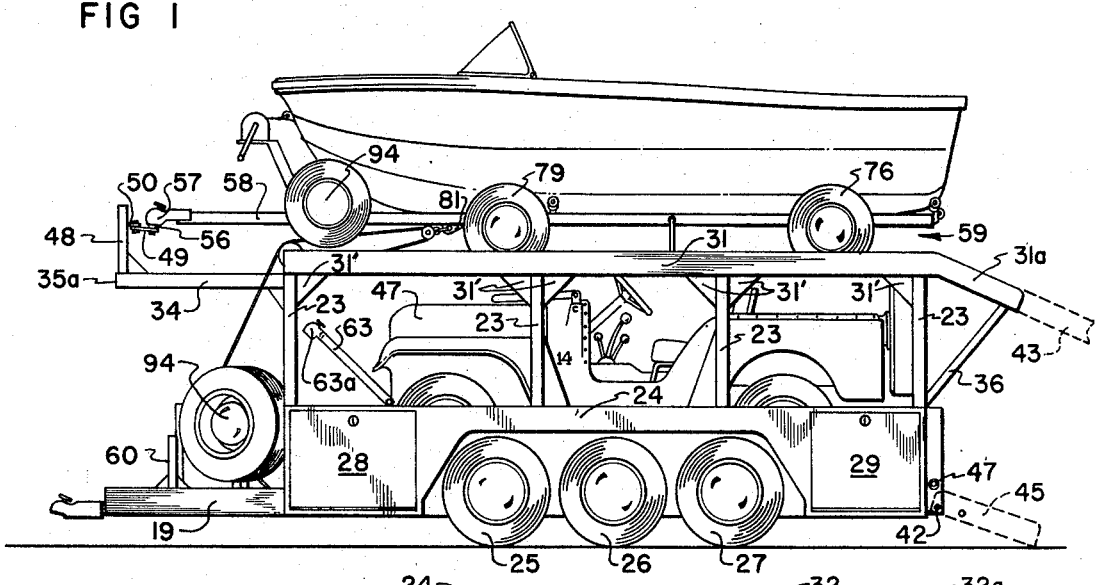
Figure 5:
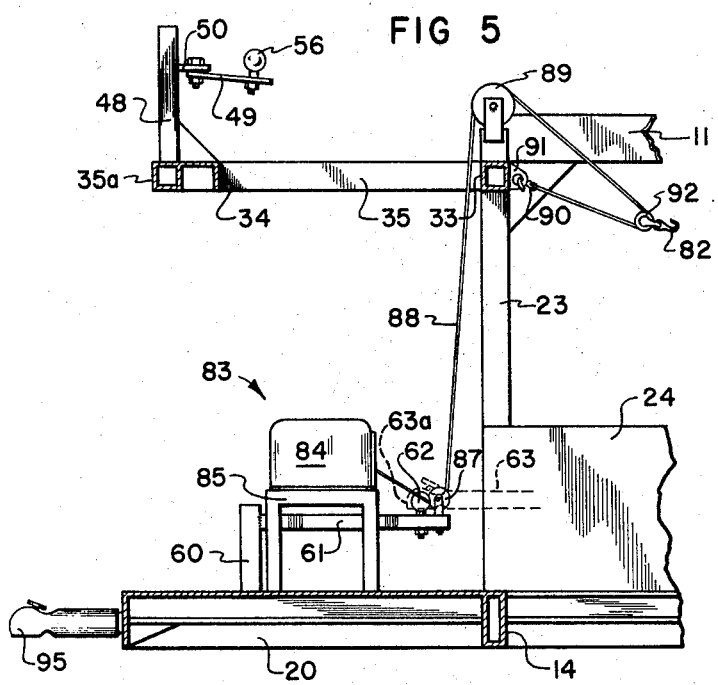

Referring now to the drawings:

In the illustrated preferred embodiment, the trailer unit of the invention includes a frame with elongate, lower trackways 10 and 11 interconnected by spaced cross-braces 13, and front and rear end members 14 (FIG. 5) and 15, respectively. A central stiffener member 16 extends parallel to the trackways and from the rear end member 15 forwardly of the front end member to join with a lead member 17 of the trailer tongue shown generally at 18. Angled braces 19 and 20 then extend rearwardly from the lead member to engagement with side rails 21 and 22. The side rails support spaced upright posts 23 and a plate metal box 24 formed rigidly around the posts and over the wheels 25, 26 and 27 at each side of the frame. Doors 28 and 29, at each side of the unit provide access to the interior of the boxes 24 so that they can be used for storage. The boxes 24 extend upwardly from the side rails 21 and 22 and serve as stiffeners for the upstanding posts. In addition, the posts 23 are further stiffened by gusset plates 30 extending further up the posts and welded, or otherwise affixed thereto and to the top plates of the boxes 24. A conventional trailer coupling 18a extends forwardly from the lead member so that the unit can be attached to a towing vehicle in the usual manner.

Upper guide tracks 31 and 32 at opposite sides of the frame extend parallel to the trackways 10 and 11 and are supported above the sets of wheels 25, 26 and 27 by the posts 23. A cross member 33 extends between the spaced guide tracks 31 and 32 and members 34 and 35 extend outwardly thereof, converging above the braces 19 and 20 to an upper front member 35a.

At the rear end of the unit the tracks 31 and 32 extend beyond the frame and are angled at 31a and 32a, slightly downwardly. Support braces 36 and 37 then extend from beneath the ends of the tracks 31 and 32 to the junctions of the rearmost upright posts 23 with the top plates of boxes 24.

Gusset plates 31' are welded or otherwise affixed between the bottoms of tracks 31 and 32 and the posts 23 supporting them to further strengthen the frame.

Figure 8:
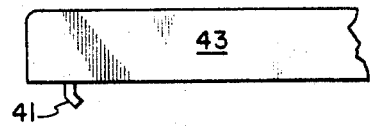

A pair of slots 39 and 40 are provided in the rearmost edge of each of the downwardly angled portions 31a and 32a of the tracks 31 and 32. Each pair of slots is then adapted to receive a pair of hooks 41 only one of which Fig. 8, is shown on a typical one of the ramp extensions 43.

Figure 2:
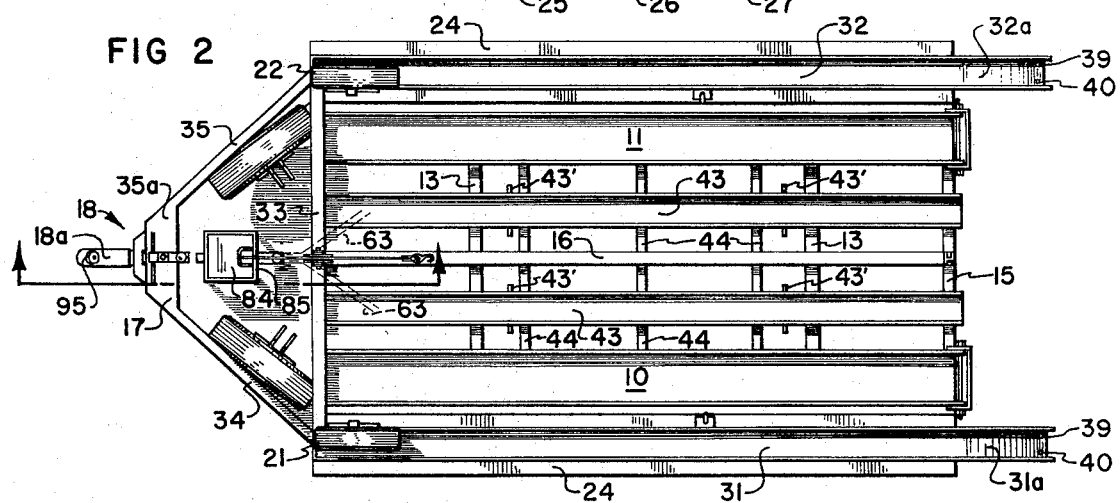
Figure 3:
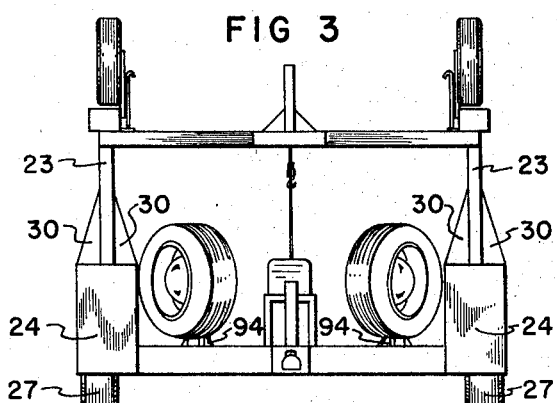
Figure 4:
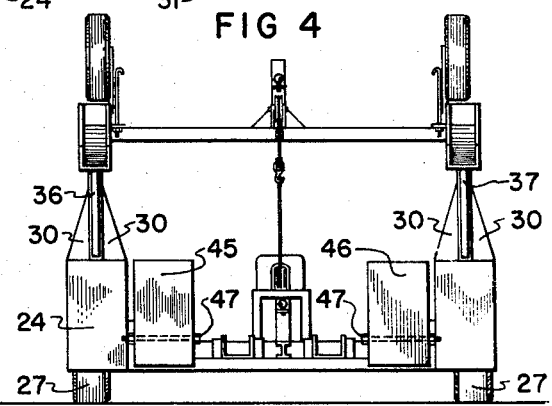

When the hooks 41 are engaged in the slots 39 and 40, the ramp extensions form continuations of the tracks 31 and 32 and serve as inclined surfaces between the tracks and the ground surface. Preferably, both the tracks and the ramp extensions are formed of channel members and when the extensions are connected the side flanges of the channel members are upturned to serve as side guides for the wheels as a boat and boat trailer is moved on them in a manner to be hereinafter explained in greater detail. Cross pieces 43' are fixed to the underside of the channel members and extend transversely thereof. Thus, when the ramp extensions are positioned on the cross braces 13 as shown best in FIG. 2, the cross pieces extend downwardly between the cross braces and parallel axle housings 44 to keep the ramp extensions from sliding off the trailer unit.

The sets of wheels comprise a wheel 25, a wheel 26 and a wheel 27 on each side of the unit and axles (not shown) extend through the axle housings in conventional fashion to connect each set of wheels. The axle housings are fixed beneath and support the stiffener member 16 and the side rails 21 and 22 and the axle housing and wheels are positioned to give maximum distribution of the weight of the trailer unit and the vehicles carried thereon.

The lower trackways 10 and 11 have extensions 45 and 46 pivotally connected thereto at 42. The extensions 45 and 46 are generally U-shaped channel members, like the trackways 10 and 11, but the flanges thereof are outside the flanges of the trackways. Thus, when the extensions are pivoted upwardly, as shown in FIGS. 1-4, pins 47 can be inserted through matching holes in the flanges of trackways 10 and 11 and the flanges of the extensions 45 and 46 to lock the extensions in their raised positions. When the pins are removed the extensions can be lowered to the ground to form inclined continuations of the trackways so that a wheeled vehicle, such as the jeep 47, can be driven thereon.

A stanchion 48 projects upwardly from the center of upper front member 35 and one end of a plate 49 is pivotally connected to an ear 50 projecting from the upper end thereof by a bolt 51. A conventional coupling ball 56 is secured to and projects upwardly from the plate such that it can be engaged by a coupling 57 on the end of tongue 58 of the boat support trailer, shown generally at 59.

Another stanchion 60 extends upwardly from the lead member 17 and has one end of an arm 61 projecting rearwardly therefrom. The other end of the arm 61 has a conventional ball coupling 62 extending upwardly therefrom to receive the mating coupling 63 on the free end of a tow bar arm 63 pivotally connected to the land vehicle being carried. Thus, when the land vehicle is properly positioned in the trailer unit the arm 63 can be pivoted to its lowered position and can be readily attached to the ball 62 so that the vehicle is locked and will not inadvertently come off the trailer unit.

Figure 6:
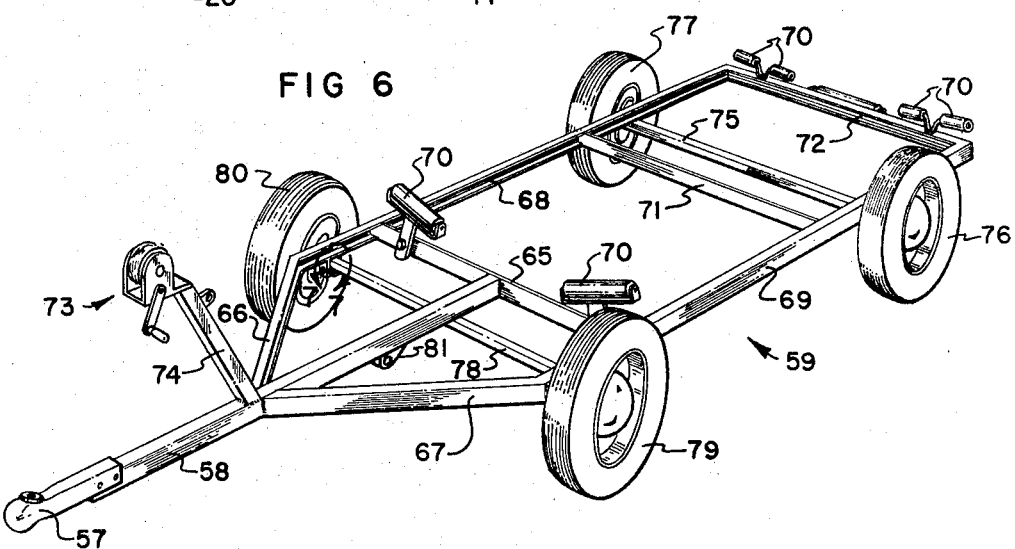
Figure 7:
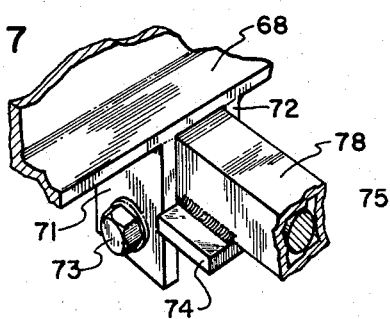

The boat support trailer 59 (FIG. 6) includes the usual box frame from which the tongue 58 projects and diagonal braces 66 and 67 extending from side rails 68 and 69, respectively to give rigidity to the tongue.

Tongue 58 is connected to a cross brace 65 and additional cross braces 71 and 72 also interconnect the side rails 68 and 69. The usual rollers 70 are mounted on the cross braces 65 and 72 to facilitate movement of the boat onto and off of the trailer 59, and a conventional winch assembly 73, on a stanchion 74 that extends upwardly from the tongue provides the means for moving the boat onto the trailer.

Trailer 59 has a rear axle housing 75 extending beneath and welded or otherwise permanently affixed to the side rails 68 and 69. The usual axle, not shown, extends through the axle housing and wheels 76 and 77 are provided on the ends thereof.

Another axle housing 78 extends beneath the side rails 68 and 69, ahead of the cross brace 65 and is removably secured to the cross braces. For this purpose, spaced flanges 71 and 72 extend downwardly from each side rail and bolts 73 are inserted therethrough. Plates 74 are affixed to the bottom of the axle housing such that they will abut the bolts when the axle housing is between the flanges 71 and 72. While the plates 74 are both shown between the bolts 73, it should be obvious that they could both be outside. It is only necessary that they be positioned to prevent longitudinal movement of the axle housing with respect to the flanges 71 and 72. An axle 75 extends through housing 78 and wheels 79 and 80 are attached in the usual fashion to the ends of the housing.

The wheels 79 and 80 serve to support and guide trailer 59 and a boat thereon as it is pulled onto the trailer unit. However, merely by removing bolts 73 the axle housing 78, the axle therein and the wheels 79 and 80 can be dropped away from the trailer frame and the trailer 59 can be towed and used in the same manner as any conventional boat trailer.

An eye 81 is formed on the bottom of tongue 58 so that a hook 82 of a winch assembly, shown generally at 83 can be attached thereto. The winch assembly includes an electric motor and drum unit 84, mounted on a platform 85 above tongue 18. An arm 86 extends rearwardly from platform 85 and a pulley 87 is mounted thereon. The cable 88 of the winch unit passes beneath the pulley 87 and up over a pulley 89, on the top of upper front member 35 before terminating in a hook 90 connected to an eye 91 on the upper front member. A pulley 92, having the hook 82 thereon runs on the cable between eye 91 and pulley 89 and, when the winch is released the hook 82 will engage the eye 81 on tongue 58. Thus, a double cable strand is provided to pull the trailer 59 onto the trailer unit and the power with which the trailer unit is pulled is increased over that obtainable if only a single strand were used.

Spare wheel mounts 94 are provided on the trailer unit as shown to carry spare tires for the trailer unit and trailer 59.

In operations, the extensions 45 and 46 of lower trackways 10 and 11 are lowered to enable the land vehicle to be driven on. After the vehicle has been coupled to the trailer unit the extensions 45 and 46 can be raised and locked in position for travelling. The trailer 59 and boat thereon are moved onto the trailer unit by using cable 88 and winch means 83 to pull the trailer up the ramp extensions 43 and 44 when the ramp extensions are hooked to tracks 31 and 32. When the trailer 59 is fully on the tracks 31 and 32 and has been coupled to the trailer unit the ramp extensions can be disconnected and stored on the cross braces 13 and the front and rear end members 14 and 15, as previously described.

The trailer tongue 18 has the usual socket-type trailer coupling 95 on the end thereof and the trailer unit is thus adapted to be connected to a towing vehicle for travel.

While winch 83 has been disclosed as being electrically powered, the power being supplied from the towing vehicle, it should be apparent that a gasoline powered winch or other suitable power driven winch could as well be used.

Although a preferred form of my invention has been herein disclosed, it is to be understood that the present disclosure is by way of example and that variations are possible, without departing from the subject matter coming within the scope of the following claims, which subject matter I regard as my invention.

I claim:

1. A trailer unit for simultaneously transporting land and water craft comprising
    a rectangular frame having a front end and a rear end;
    a trailer tongue including a trailer coupling extending forwardly from the front end of the frame;
    wheels at each side of the frame and outboard thereof;
    parallel lower tracks supported by the frame inboard of the wheels;
    support posts extending upwardly from the frame;
    upper tracks supported on top of the posts and above the wheels;
    a boat carrying trailer comprising
        a frame,
        a tongue projecting forwardly of the frame and having a trailer coupling on the end thereof,
        a rear wheel at each side of the frame adjacent the rear end thereof,
        an axle housing adapted to extend across the frame at a point forwardly of the rear wheels,
        an axle through the housing,
        a wheel at each end of the axle and means for releasably securing the axle housing to the frame,
        means for moving the boat carrying trailer and a boat thereon onto the upper tracks; and
        means including an upright stanchion, means supporting said stanchion ahead of the frame, and a ball coupling pivotally connected to the stanchion, for locking the boat carrying trailer in place on the upper tracks.

2. A trailer unit as in claim 1, further including
    rigid boxes supported by the frame, extending the length of the frame and surrounding the lower ends of the support posts, whereby the boxes support the posts; and
    doors providing access to the interiors of the boxes.

3. A trailer unit as in claim 1, further including means on the rectangular frame for locking a land vehicle thereon.

4. A trailer unit as in claim 3, wherein the means for locking a land vehicle on the frame includes
    an upstanding stanchion post carried by the tongue; and
    coupling means carried by the stanchion post and adapted to be connected to a coupling means on a towbar attached to the land vehicle.

5. A trailer unit as in claim 1, wherein the means for moving the
    boat carrying trailer and a boat thereon onto the upper tracks includes
        a powered winch carried by the tongue on the trailer unit;
        an eye on the tongue of the boat carrying trailer; and
        a cable operated by the winch and having hook means thereon whereby it is connectable to the eye.

* * * * *